United States Patent
Haselton et al.

(10) Patent No.: US 8,117,162 B2
(45) Date of Patent: Feb. 14, 2012

(54) DETERMINING WHICH USER FILES TO BACKUP IN A BACKUP SYSTEM

(75) Inventors: William R. Haselton, Nashua, NH (US); Jennifer M. Shaw, North Andover, MA (US); Christopher J. Stakutis, Concord, MA (US)

(73) Assignee: International Business Machines Corporation, Armonk, NY (US)

( * ) Notice: Subject to any disclaimer, the term of this patent is extended or adjusted under 35 U.S.C. 154(b) by 860 days.

(21) Appl. No.: 11/689,231

(22) Filed: Mar. 21, 2007

(65) Prior Publication Data

US 2008/0235299 A1    Sep. 25, 2008

(51) Int. Cl.
*G06F 17/00* (2006.01)
(52) U.S. Cl. .................... 707/640; 707/644; 707/654
(58) Field of Classification Search .................. 707/204, 707/654, 644, 640; 709/201
See application file for complete search history.

(56) References Cited

U.S. PATENT DOCUMENTS

| | | | |
|---|---|---|---|
| 5,758,067 A | 5/1998 | Makinen et al. | |
| 5,991,780 A | 11/1999 | Rivette et al. | |
| 6,108,799 A | 8/2000 | Boulay et al. | |
| 2004/0167942 A1 | 8/2004 | Oshinsky et al. | |
| 2004/0193953 A1 | 9/2004 | Callahan et al. | |
| 2005/0010616 A1 | 1/2005 | Burks | |
| 2005/0015652 A1* | 1/2005 | Han et al. | 714/6 |
| 2005/0021950 A1 | 1/2005 | Rothbarth et al. | |
| 2005/0131990 A1 | 6/2005 | Jewell | |
| 2005/0246631 A1 | 11/2005 | Mori | |
| 2006/0013219 A1* | 1/2006 | Neilson et al. | 370/389 |
| 2007/0174692 A1* | 7/2007 | Nagasawa | 714/13 |

OTHER PUBLICATIONS

Iomega, "Iomega automatic backup pro", Iomega., [online], [retrieved on May 6, 2005] http://www.iomega.com/support/manuals/iabpro32/iabpro/printall.html.*

* cited by examiner

*Primary Examiner* — Belix M Ortiz
(74) *Attorney, Agent, or Firm* — Cantor Colburn LLP; Feb Cabrasawan

(57) ABSTRACT

A backup program, method and system is disclosed that monitors changes to a file in a storage, checks whether backup settings related to the file already exist and requests and applies backup settings related to the file in response to the file being changed if they do not. The backup settings are applied to control operation of a backup system to make one or more backup copies of the file. The backup settings may be electively saved to be applied automatically in the event of future changes to the file without requesting the settings. One or more lists may be used to identify (e.g. include or exclude) files for backup. Files may be identified by different categories including file name, file type, or file type group associated with a particular application. A typical backup system may save backup copies to a storage area network, e.g. controlled by a backup server.

18 Claims, 8 Drawing Sheets

DETERMINING WHICH USER FILES TO BACKUP IN A BACKUP SYSTEM

BACKGROUND OF THE INVENTION

1. Field of the Invention

This invention relates to data backup and restore systems in a computer system. Particularly, this invention relates to facilitating the capture of user settings for data backup and restore systems.

2. Description of the Related Art

For a backup product running on an end user's desktop, it can be challenging to develop convenient processes for the backup system to determine the operational settings desired by the user. Particularly, one of the principle settings directing the operation of a data backup system determines what files to backup. The simplest approach, of course, is to just backup all data. However, time and storage space constraints often make such an approach impractical, if not impossible.

Many backup systems operate by populating lists specifying the files and/or file types to be included in a backup. The system, e.g. a backup software client running on the user system, then monitors changes to any files included on the populated lists and makes backups of those files when they are changed. The user may be provided with some default file lists, such as specifying all the files in the "My Documents" directory. The list might also be seeded with some common file extensions, such as *.doc and *.xls. In some backup systems the user may be given a list of predetermined file types to choose from, such as Office Files, Financial files, Music files, etc. Various systems and methods have been developed to facilitate making data backups of files on a computer system.

U.S. Patent Application Publication No. 20050131990 by Jewell, published Jun. 16, 2005, describes a data backup system for backing up a data file from a source device having a source processor and an input device to a target device having a target processor and a database over a communication network. The source processor determines whether the data file has been modified, and if so, to determine the modified data block(s). The modified data block(s) are transmitted from the source processor to the target processor over the communication network. The target processor receives the modified data block(s) from the source device over the communications network, and uses the modified data blocks to construct the data file, and to store the data file on the database. Concurrently, it is determined if the input device is active at any time during the backup process, and if so, the backup processing is interrupted until the input device has been inactive for a predetermined period of time.

U.S. Patent Application Publication No. 20040193953 by Callahan et al., published Sep. 30, 2004, describes a method, system, and program for maintaining configuration settings for applications on a computer system. Configuration backup information indicates configuration settings to backup for at least one of application. The configuration backup information is processed to access the indicated configuration settings for the at least one application on the computer system to backup and the accessed configuration settings for at least one application are stored in at least one file. The stored configuration settings are recovered for use with at least one application.

U.S. Patent Application Publication No. 20050010616 by Burks, published Jan. 13, 2005, describes a method of backing up files including storing a plurality of files on a local device, transmitting a list of the files to a backup/restoration service, identifying an ownership property associated with each of the files, and selectively restoring at least one of the files associated with an appropriate status of the ownership property. A system includes a storage medium configured to store a plurality of files, a communications link connected to the storage medium for transmitting a list of the files to a remote location, and a file server located at the remote location. The file server is connected to the communications link and operable to receive and store the list of files in response to a restoration request for selectively restoring files associated with an appropriate status of an ownership property associated with the files.

U.S. Patent Application Publication No. 20040167942 by Oshinsky et al., published Aug. 26, 2004, describes a data retrieval system comprising a first computing device communicatively coupled to a second computing device; the first computing device having a processor that supports operation of at least one software application that is used for retrieving data; the second computing device communicatively coupled to one or more storage media; the software application having a retrieval module for retrieving data from the one or more storage media; a storage and backup map that maps to the second computing device; and a data index stored on the second computing device that indicates to the retrieval module a particular location of the data that is to be retrieved by the retrieval module.

U.S. Patent Application Publication No. 20050021950 by Rothbarth et al., published Jan. 27, 2005, describes an application and method for transmitting copies of data to a remote back-up site for storage, and for retrieving copies of the previously stored data from the remote back-up site. A user designates files from an originating computer for which to transfer copies to a destination computer. The originating computer transfer designated data to portable computer readable medium for storage. The portable medium is physically delivered to the destination user. The destination user uploads the stored data to the destination computer. The destination computer authenticates the uploaded data. If the data is authenticated, the destination computer stores copies of the designated files.

U.S. Pat. No. 6,108,799 by Boulay et al., issued Aug. 22, 2000, describes a system and method for automatically generating at least one instance of a computer macro virus that is native to or associated with an application. The method includes steps of (a) providing a suspect virus sample; and (b) replicating the suspect virus sample onto a least one goat file, using at least one of simulated user input or interprocess communication commands for exercising the goat file through the application, to generate an infected goat file. A further step can be executed of (c) replicating the infected goat file onto a least one further goat file, using at least one of simulated user input, such as keystrokes, mouse clicks and the like, or interprocess communication commands, to generate an additional instance of an infected goat file. The step of providing includes a step of determining attributes of the suspect virus sample, and the steps of exercising employ simulated user input or interprocess communication commands that are selected based at least in part on the determined attributes. As a parallel process the steps of exercising include steps of detecting an occurrence of a window, such as a pop-up window that is opened by one of the application or the macro virus; and using at least one of simulated user input or interprocess communication command(s) for closing the opened window. In this manner the replication process is not halted by a window that requires input from a user.

U.S. Patent Application Publication No. 20050246631 by Mori, published Nov. 3, 2005, describes storing and managing one document of respective parts as electronic data created by a plurality of applications regardless of the type of application program which creates each part of one document. For this purpose, a plurality of shared folders are set on a network, and attributes in printing are set for the shared folders. A hot folder program supervises the shared folders. When a document image data file scanned by a multifunction apparatus is stored in one of the shared folders, the hot folder program causes an action program to perform a process complying with the attributes set for the shared folder which stores the file, and a bookbinding application to import the file.

U.S. Pat. No. 5,758,067 by Makinen et al., issued May 26, 1998, describes a system and method for automatically archiving data from a computer system to a backup system. The system provides a scheduler, connected to an automated backup mechanism, for scheduling when full backups are performed and when incremental backups are performed. A simple user interface is provided to ensure that once the end user has enabled the system, daily automatic backups will be performed without further input from the end user.

However, current backup systems do not operate as conveniently as they might. For example, one problem with the described techniques that employ file lists to identify files to backup is that these predetermined lists are not comprehensive; they cannot account for every possible file type that the user may eventually have on his computer. Moreover, a comprehensive list of every possible file type a user could have on her system would be virtually impossible to provide. Another issue with such techniques is that the selection of file types to backup is commonly performed during the initial configuration of the backup system, e.g. right after installation. Thus, even if the user correctly identifies all the file types that need to be backed up, files associated with any later installed applications will not be processed into the backup lists. Users will often forget to enter the backup software and add appropriate settings to include the new files or file types.

In view of the foregoing, there is a need in the art for data backup systems and methods for conveniently and efficiently determining and tracking which files are to be backed up. There is a need for systems and methods to handle backup settings for every file that may be employed by an application operating on the user system. Further, there is a need for such systems and methods to address the problem of new file types associated with applications installed after the backup system has been installed and initially configured. These and other needs are met by the present invention as detailed hereafter.

SUMMARY OF THE INVENTION

A backup program, method and system is disclosed that monitors changes to a file in a storage, checks whether backup settings related to the file already exist and requests and applies backup settings related to the file in response to the file being changed if they don not. The backup settings are applied to control operation of a backup system to make one or more backup copies of the file. The backup settings may be electively saved to be applied automatically in the event of future changes to the file without requesting the settings. One or more lists may be used to identify (e.g. include or exclude) files for backup. Files may be identified by different categories including file name, file type, or file type group associated with a particular application. A typical backup system may save backup copies to a storage area network, e.g. controlled by a backup server.

A typical embodiment of the invention comprises a computer program embodied on a computer readable medium including program instructions for monitoring changes to a file in a storage, program instruction for checking whether backup settings related to the file exist, program instructions for requesting the backup settings related to the file in response to the file being changed and the backup settings related to the file not existing, and program instructions for applying the backup settings to control operation of a backup system to make one or more backup copies of the file. In some embodiments, applying the backup settings may comprise electively saving the backup settings in one or more lists of identified files to be backed up. The identified files may be identified by categories including file name, file type and a file type group associated with an application. Monitoring the changes to the file may comprise filtering an operating system controlling the changes to the file to signal the changes occurring. Similarly, filtering the operating system can also be used to signal which application is responsible for the change to the file.

In further embodiments, the computer program may include program instructions for identifying an application responsible for changing the file and program instructions for determining whether an application list comprising one or more set backup applications includes the application. In this case, the backup settings are not requested in response to determining that the application list includes the application. Applying the backup settings may comprise electively saving the backup settings by adding the application responsible for changing the file to the list of the one or more set backup applications.

In some embodiments, applying the backup settings may comprise electively saving the backup settings such that, in response to saving the backup settings, further one or more backup copies of the file will be made repeatedly thereafter in response to further changes to the file without requesting the backup settings.

Embodiments of the invention can be implemented where a file type may be associated with a plurality of file type files and the plurality of file type files includes the file and applying the backup settings comprises electively saving the backup setting such that the one or more backup copies will be made for each change to any of the plurality of file type files changed thereafter. Further, embodiments may encompass tracking one or more file type groups each associated with a particular application. For example, a file type group associated with an application may include a plurality of file types, each associated with a plurality of file type files, and one of the plurality of file type files includes the file. In this case, applying the backup settings comprises electively saving the backup settings such that the one or more backup copies will be made for each change to any of the plurality of file type files associated with any of the plurality of file types of the file type group associated with the application. To track backup settings corresponding to files associated with different applications, the backup settings may comprise an application list including one or more set backup applications and the application is electively saved to the application list.

In a similar manner, a typical method embodiment of the invention comprises the steps of monitoring changes to a file in a storage, checking whether backup settings related to the file exist, requesting the backup settings related to the file in response to the file being changed and the backup settings related to the file not existing, and applying the backup settings to control operation of a backup system to make one or more backup copies of the file. Method embodiments of the invention may be further modified consistent with the program and system embodiments described herein.

Other embodiments of the invention may similarly comprise a computer system, including a storage for a file and a processor for monitoring changes to the file in the storage, checking whether backup settings related to the file exist, requesting the backup settings related to the file in response to the file being changed and the backup settings related to the file not existing and applying the backup settings to control operation of a backup system to make one or more backup copies of the file. The one or more backup copies of the file may be saved to a storage area network, such as overseen by a backup system operating on a distributed network.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Overview

As previously mentioned, embodiments of the invention operate by monitoring changes to a file in a storage, checking whether backup settings related to the file exist and requests and applying backup settings related to the file in response to the file being changed if they don not. The backup settings are applied to control operation of a backup system to make one or more backup copies of the file. In contrast, prior art systems do not prompt a user for backup settings; the user must decide to access the interface for backup settings and enter the desires settings for handling a particular file or file type.

Figure 1A:
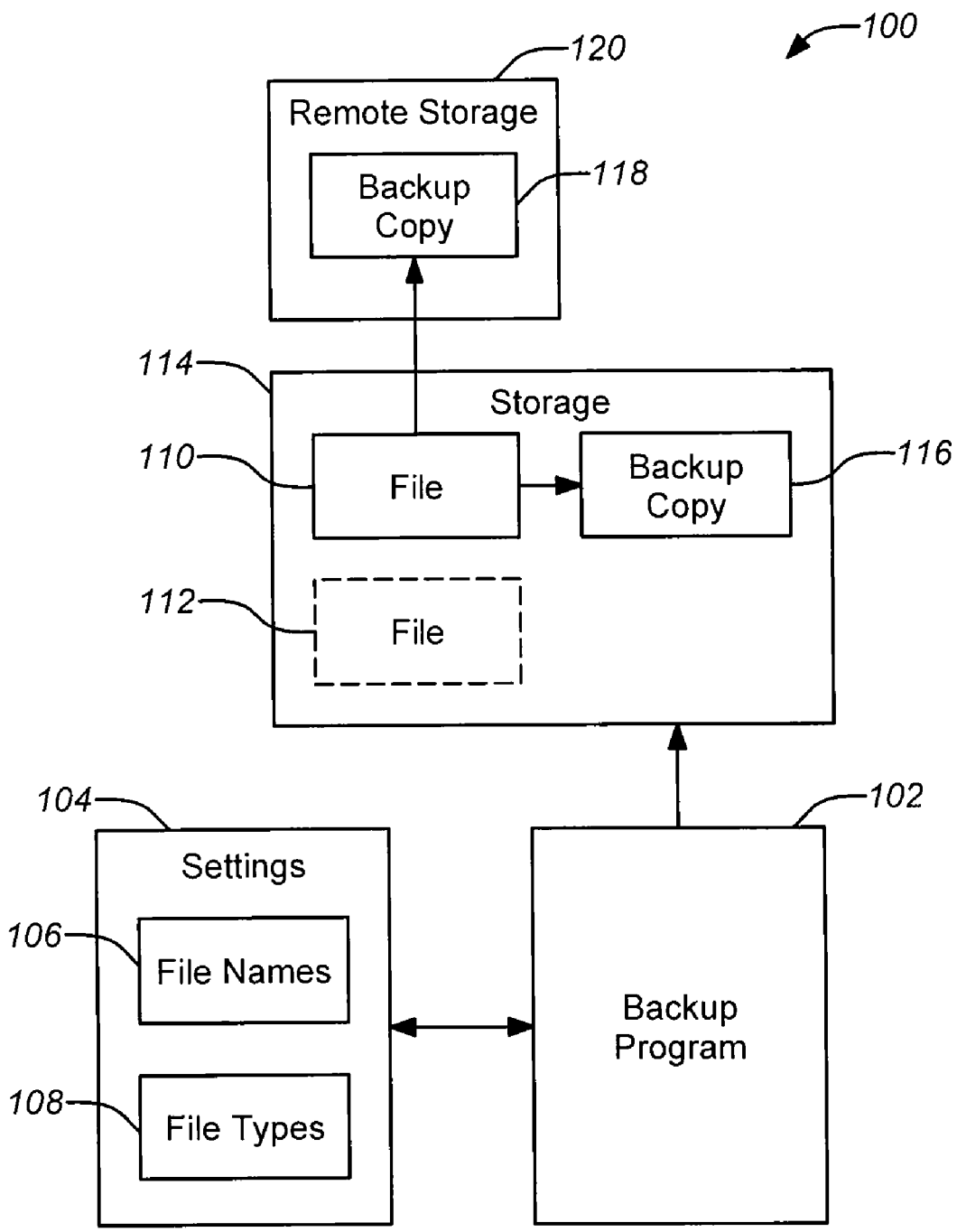
FIG. 1A is a functional block diagram of a prior art technique for determining backup settings.

FIG. 1A is a functional block diagram of a prior art technique for determining backup settings. The conventional backup system 100 may operate as backup software 102 operating on a computer system. The backup software 102 stores backup settings 104 to identify which files will be backed up and which will not. The backup settings 104 may comprise one or more lists of file names 106 and/or file types 108 to be backed up. As is well known in the art, file types define different categories of files, typically indicating different data formats. Different file types are identified by the file extension, the end portion of the file name separate by a period delimiter (e.g., a text file is identified by the ".txt" extension at the end of the file name).

The backup software 102 may operate by monitoring any changes to files 110, 112 in storage 114. Note that the term "change" as used throughout this description includes the creation of a new file. Also, the term "file" as used throughout this description includes directories and subdirectories (and any underlying files). When a change to a file 110, 112 is detected, the backup software checks to determine if the backup settings 104 identify the file 110, 112. If the changed file 110 is identified in the backup settings 104, by file name 106 or file type 108, the backup program 102 responds by saving either saving a backup copy 116 in the local storage 114 or a backup copy 118 in a remote storage 120 as indicated by additional settings and/or depending upon the overall backup system. For example, in some embodiments, the backup software 102 may be a backup program operating on a client computer system that is coupled to a backup server over a computer network which manages backup files on a remote backup repository. However, if a change is indicated in a file 112 that is not included in the backup settings 104, the backup software 102 takes no action provides no indication of the situation to the user. Conventional backup software 102 is not designed to anticipate the possibility that the user may desire a backup copy to be made with an unregistered file 112. Embodiments of the present invention address this shortcoming.

Figure 1B:
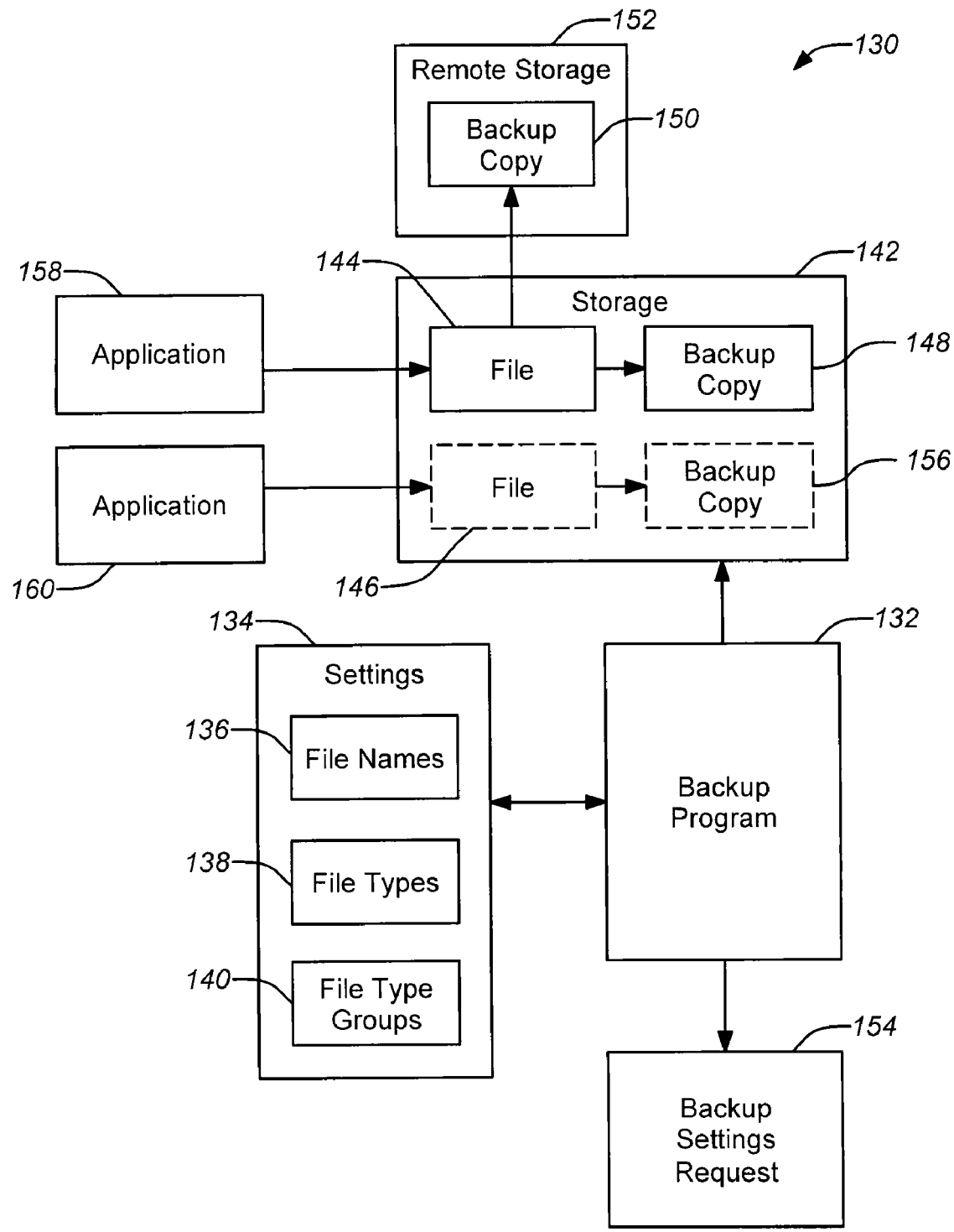
FIG. 1B is a functional block diagram for determining backup settings with an embodiment of the invention.

FIG. 1B is a functional block diagram for determining backup settings with an embodiment of the invention. The backup system 130 may operate as backup software 132 operating on a computer system. A typical backup system may save backup copies to a storage area network, e.g. controlled by a backup server. A backup system 130 embodiment of the invention introduces prompting the user to apply backup settings in some situations. At a basic level of operation, embodiments of the invention may employ backup settings 134 including file names 136 and/or file types 138 to be included (or excluded) from having a backup copy made. The backup program 132 monitors for changes to files 144, 146 in a storage 142 of the computer and checks for existing backup settings 134 related to any changed file 144, 146. (Identified file names 136 and/or file types 138 may be specified in the backup settings 134 as either included or excluded from being backed up.) If relevant backup settings 134 exist, the backup program 132 operates to save one or more backup copies 148, 150 (in either the local storage 142 or a remote storage 152 as appropriate according to the settings or ordinary operations of the backup system 130). However, if a file 146 is changed for which there are no existing backup settings 134, embodiments of the present invention automatically direct a backup settings request 154 to the user in order to determine whether a backup copy 156 should be made for the current file 146. (Note, although not shown, the current file 146 may also have a backup copy made to a remote storage 152 just as with the first file 144.) Any new backup settings may be electively saved by the user to the backup settings 132 to be applied automatically in the event of future changes to the file 146 without requesting the settings.

Embodiments of the invention may also include a new category to be tracked in the backup settings 134, file type groups 140. A file type group 140 is a plurality of file types that are associated with one another. Typically, a file type group 140 may comprise all the file types associated with a particular software application (or possibly a group of applications); a newly installed application may introduce more than one new file type into the computer. For example, Microsoft Powerpoint introduces file types, *.POT, *.POTHTL, *.POTM, *.POTX, *.PPA, *.PPSM, *.PPSX, *.PPT, *.PPTHTML, *.PPTM, *.PPTMHTML, and *.PPTX. By adding file type groups (e.g. applications) to the backup settings, backup setting requests are more efficient and the number of times that backup setting requests are made is reduced.

Thus, the backup system 130 may operate by monitoring both changes to files 144, 146 in the storage 142 as well as the application 158, 160 responsible for the change. For example, embodiments of the invention may "hook" or filter the operating system to signal whenever a file is changed and what application changed it. Such filtering means that the operating system (or file system) are wrapped with additional software (as in a software stack) so that they can monitor and/or control basic operations of the applicable operating or file system. If the file is not accounted for in the backup settings 134 of the backup system (e.g. either an "include" or "exclude" list), the user may be presented with the backup settings request 154 including a list of setting options. For example, a pop up dialog box may be used for this to direct the backup system 130 with respect to the file 146 (and possibly other related files) when it is changed in the future. Based on the user selection, the backup program 154 can populate either the include list or exclude list as appropriate. In this way, the backup product learns what files to protect over time.

A typical usage pattern would be that when the user first installs the backup product, he is presented with the backup settings request fairly often as the product monitors files being changed that were not in the default include/exclude lists. But after a while, the choices should stop being presented as the system has learned what files (types, and group types) to protect. Then, if a user installs a new application, e.g. Microsoft PowerPoint in the example above, the first time PowerPoint saves a file, the user will be presented with the choices for that file.

2. Hardware Environment

Figure 2A:
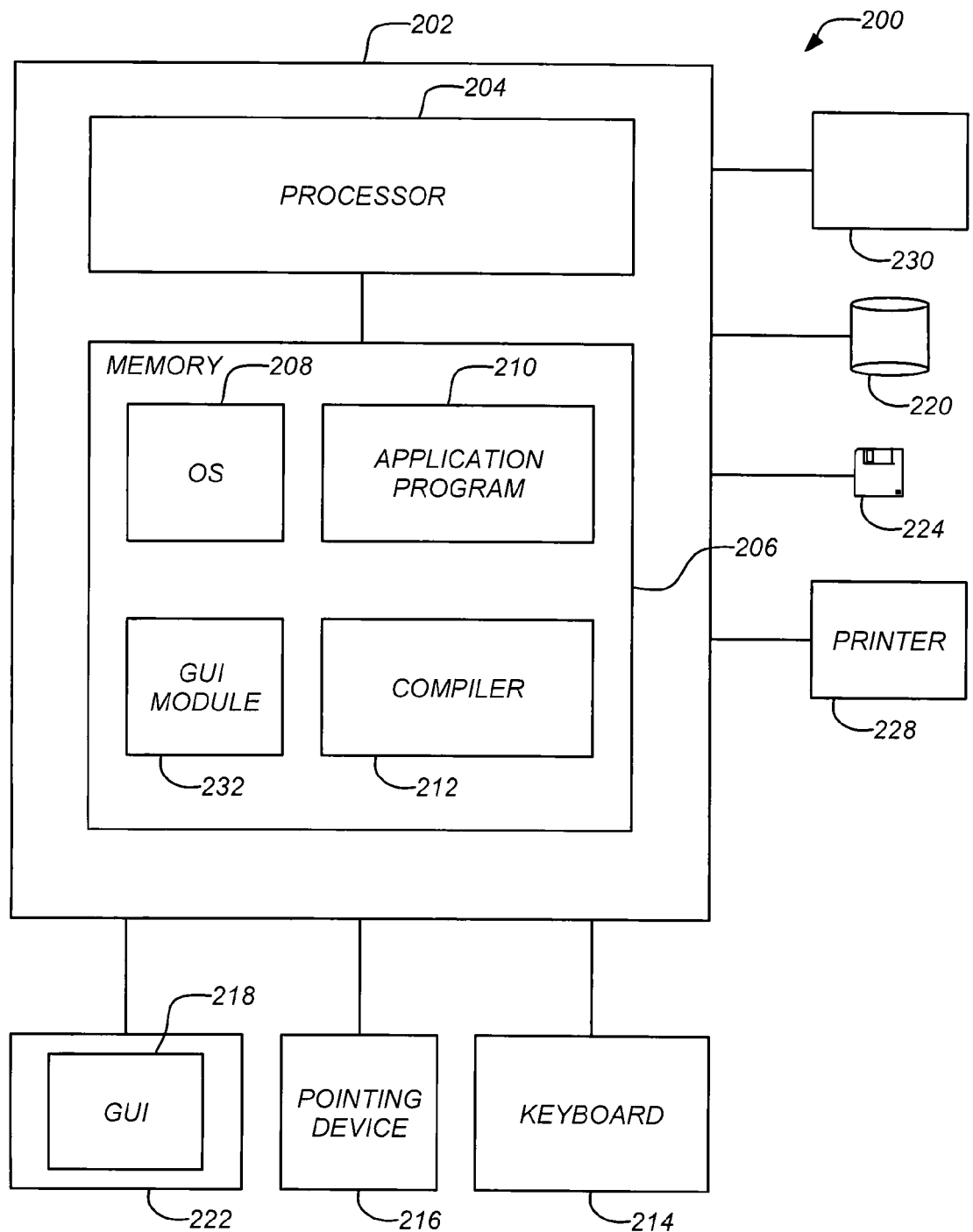
FIG. 2A illustrates an exemplary computer system that can be used to implement embodiments of the present invention.

FIG. 2A illustrates an exemplary computer system 200 that can be used to implement embodiments of the present invention. The computer 202 comprises a processor 204 and a memory 206, such as random access memory (RAM). The computer 202 is operatively coupled to a display 222, which presents images such as windows to the user on a graphical user interface 218. The computer 202 may be coupled to other devices, such as a keyboard 214, a mouse device 216, a printer 228, etc. Of course, those skilled in the art will recognize that any combination of the above components, or any number of different components, peripherals, and other devices, may be used with the computer 202.

Generally, the computer 202 operates under control of an operating system 208 (e.g. z/OS, OS/2, LINUX, UNIX, WINDOWS, MAC OS) stored in the memory 206, and interfaces with the user to accept inputs and commands and to present results, for example through a graphical user interface (GUI) module 232. Although the GUI module 232 is depicted as a separate module, the instructions performing the GUI functions can be resident or distributed in the operating system 208, a computer program 210, or implemented with special purpose memory and processors.

The computer 202 also implements a compiler 212 which allows one or more application programs 210 written in a programming language such as COBOL, PL/1, C, C++, JAVA, ADA, BASIC, VISUAL BASIC or any other programming language to be translated into code that is readable by the processor 204. After completion, the computer program 210 accesses and manipulates data stored in the memory 206 of the computer 202 using the relationships and logic generated using the compiler 212. The computer 202 also optionally comprises an external data communication device 230 such as a modem, satellite link, ethernet card, wireless link or other device for communicating with other computers, e.g. via the Internet or other network.

Instructions implementing the operating system 208, the computer program 210, and the compiler 212 may be tangibly embodied in a computer-readable medium, e.g., data storage device 220, which may include one or more fixed or removable data storage devices, such as a zip drive, floppy disc 224, hard drive, DVD/CD-ROM, digital tape, etc., which are generically represented as the floppy disc 224. Further, the operating system 208 and the computer program 210 comprise instructions which, when read and executed by the computer 202, cause the computer 202 to perform the steps necessary to implement and/or use the present invention. Computer program 210 and/or operating system 208 instructions may also be tangibly embodied in the memory 206 and/or transmitted through or accessed by the data communication device 230. As such, the terms "article of manufacture," "program storage device" and "computer program product" as may be used herein are intended to encompass a computer program accessible and/or operable from any computer readable device or media.

Embodiments of the present invention are generally directed to any software application program 210 that manages data objects (i.e. files) such as with a backup system managing backup storage and restore processes over a network. The program 210 may operate within a single computer 202 or as part of a distributed computer system comprising a network of computing devices. The network may encompass one or more computers connected via a local area network and/or Internet connection (which may be public or secure, e.g. through a VPN connection).

Figure 2B:
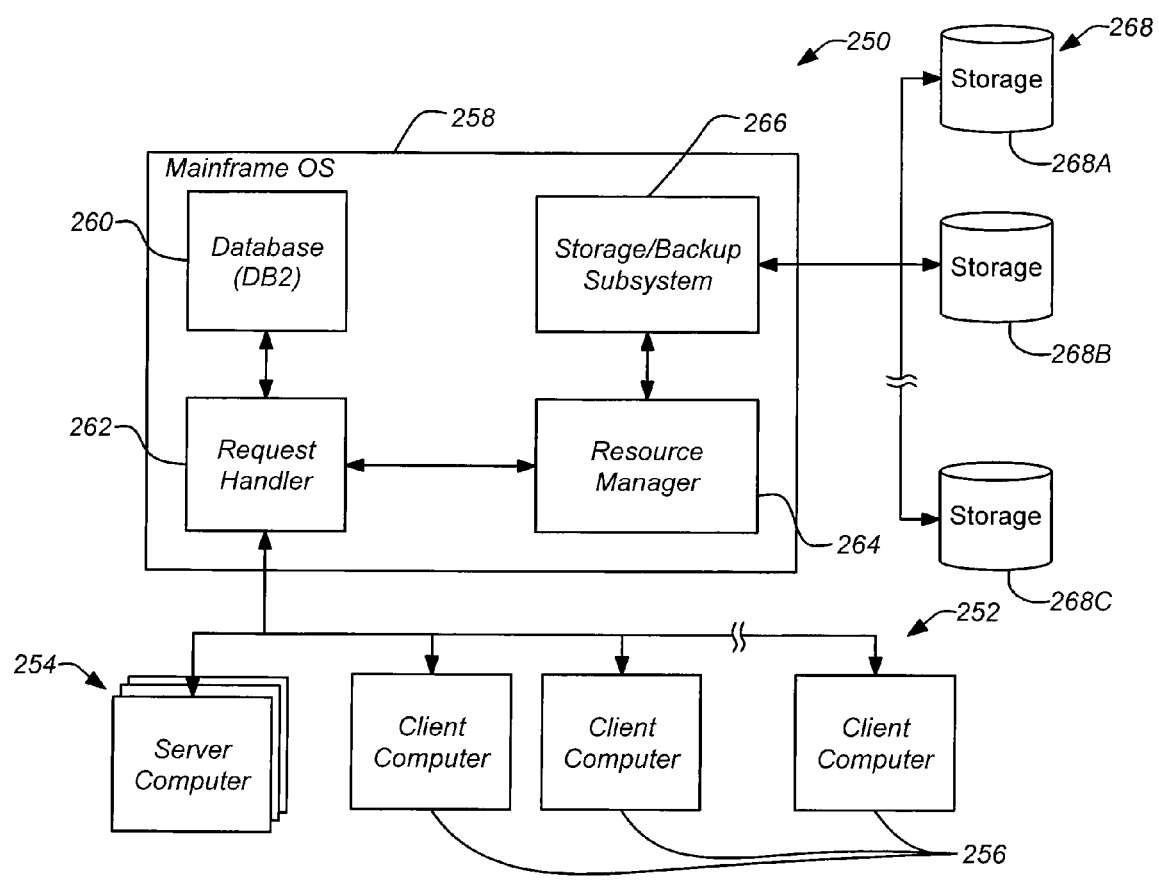
FIG. 2B illustrates a typical distributed computer system which may be employed in an typical embodiment of the invention.

FIG. 2B illustrates a typical distributed computer system 250 which may be employed in an typical embodiment of the invention. Such a system 250 comprises a plurality of computers 202 which are interconnected through respective communication devices 230 in a network 252. The network 252 may be entirely private (such as a local area network within a business facility) or part or all of the network 252 may exist publicly (such as through a virtual private network (VPN) operating on the Internet). Further, one or more of the computers 202 may be specially designed to function as a server or host 254 facilitating a variety of services provided to the remaining client computers 256. In one example, one or more hosts may be a mainframe computer 258 where significant processing for the client computers 256 may be performed. The mainframe computer 258 may comprise a database 260 which is coupled to a request handler 262 which implements a number of database procedures for other networked computers 202 (servers 254 and/or clients 256). The request handler 262 is also coupled to a resource manager 264 which directs data accesses through storage/backup subsystem 266 that facilitates accesses to networked storage devices 268 comprising a SAN. Thus, the storage/backup subsystem 266 on the computer 258 comprises the backup server which manages backup data objects from the client computers 256 stored on networked storage devices 268 in a distributed storage system. The SAN may include devices such as direct access storage devices (DASD) optical storage and/or tape storage indicated as distinct physical storage devices 268A-268C. Various known access methods (e.g. VSAM, BSAM, QSAM) may function as part of the storage/backup subsystem 266.

A typical implementation of the invention comprises a backup client program operating on a client computer 256. The backup client program tracks and controls the making of backup copies of files created and/or changed by an application running on the client computer 256. The backup client program coordinates its operations with a remote backup system (e.g. operating with a backup server communicatively coupled to the client computer through a network). The remote backup system manages backup copies which may be saved to a remote depository (e.g. on a SAN) for a plurality of client computers. Alternately, embodiments of the invention may be implemented as a stand alone backup program operating on a single computer directly managing the creation and deletion of backup copies of files automatically. In either case, the backup copies may be locally saved or saved to a remote storage device.

Those skilled in the art will recognize many modifications may be made to this hardware environment without departing from the scope of the present invention. For example, those skilled in the art will recognize that any combination of the above components, or any number of different components, peripherals, and other devices, may be used with the present invention meeting the functional requirements to support and implement various embodiments of the invention described herein.

3. Determining Which User Files to Backup

Figure 3A:
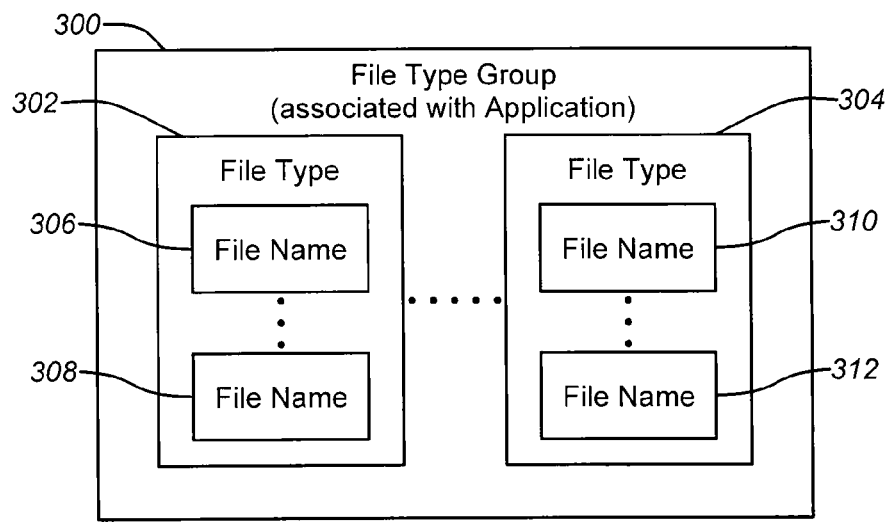
FIG. 3A illustrates the relationship between a file name, a file type and a file type group.

FIG. 3A is a diagram to illustrate the relationship between a file name, a file type and a file type group. A file type group 300 may be associated with a specific application. Each file type group 300 may include one or more file types 302, 304. In turn, each file type 302, 304 may include one or more file names 306, 308 and 310, 312, respectively. As previously mentioned, file types are typically distinguished by having different file extensions appended to the file name. These various ways to classify files are employed in the backup settings for embodiments of the invention.

Figure 3B:
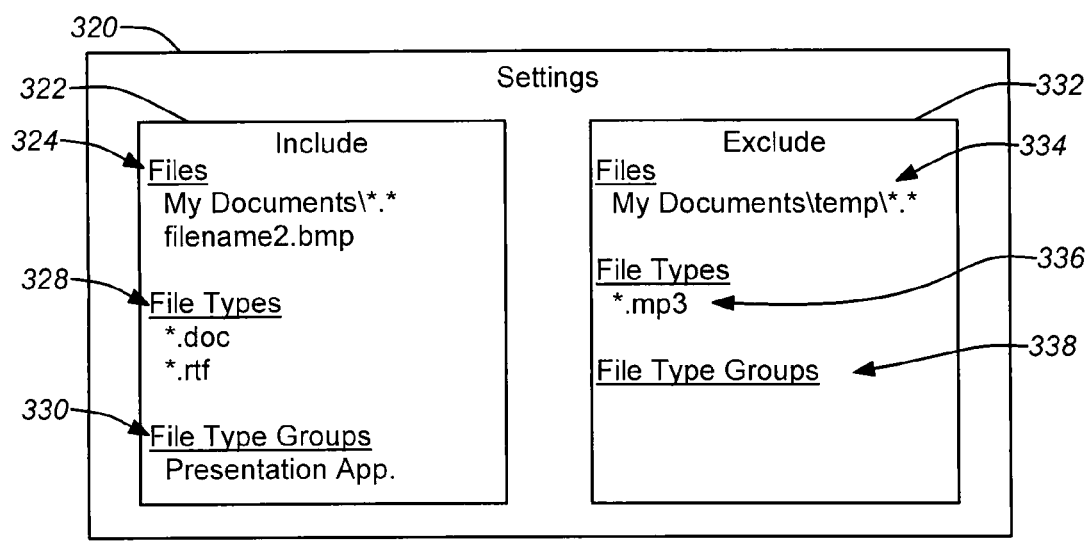
FIG. 3B illustrates one or more lists employed by the backup software to track backup settings.

FIG. 3B illustrates exemplary lists employed by an typical backup program to track backup settings 320 for files. The settings 320 include a set 322 of include lists identifying files by category, a few file names 324, as well as a few file types 326 and finally an application 330. Whenever a change is made to any file corresponding to any of the identified elements under any of the include categories, the backup program will perform the backup copy without requesting backup settings from the user. In a like manner, the settings include a set 332 of exclude lists identifying different files by the same categories, file name 334, file type 336 and file type group 338. Whenever a change is made to any file corresponding to any of the identified elements under any of the excluded categories, the backup program will not perform the backup copy but it will also not request backup settings from the user (because the software already has settings that address the particular file). Only if the backup software detects a change to a file that has no corresponding backup setting (to include or exclude), the backup software will then present a backup settings request to the user. It should be noted that the settings 320 are only present to illustrate and it is unimportant how the lists are structured. Separate lists of files, file types and file type groups to include may be used (and similarly, separate excludes lists). The following figures illustrate the operation of two example systems 400, 500. The operation descriptions of the example systems 400, 500 are consistent with the functional block diagram of FIG. 1B.

Figure 4A:
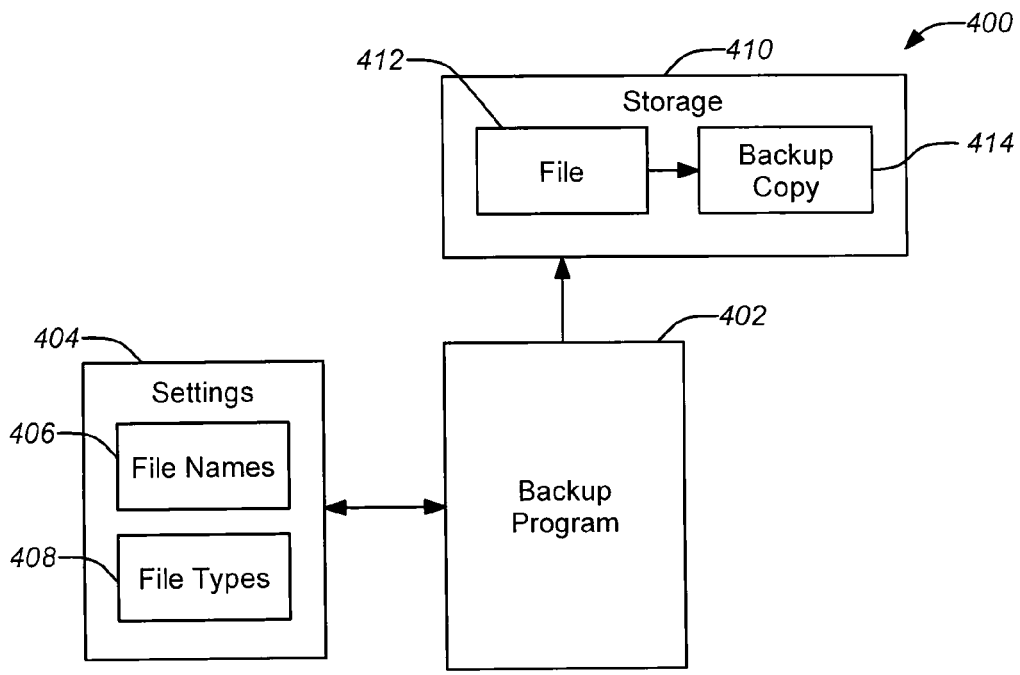
FIGS. 4A & 4B illustrates an exemplary embodiment of the invention providing a request for backup settings in response to a file being changed.
Figure 4B:
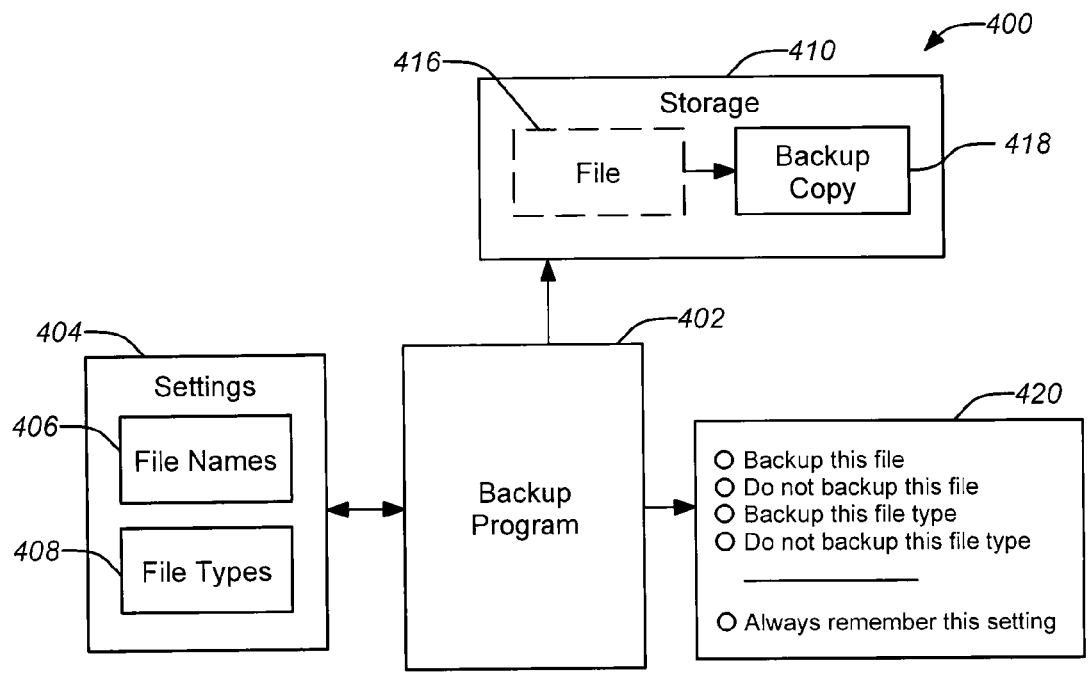

FIGS. 4A & 4B illustrates an exemplary embodiment of the invention providing a request for backup settings in response to a file being changed. This basic system 400 is capable of operating by using only the categories of file name 406 and file type 408 in the backup settings 404. FIG. 4A illustrates the response when a change to a file 412 in the storage 410 occurs for which existing backup settings 404 are indicated (either in the include or exclude file name 406 list or the include or exclude file type 408 list as illustrated in FIG. 3B). In this case, the backup program 402 simply performs the indicated backup operation and saves a backup copy 414 of the file 412. (Note that the indicated operation may alternately be to do nothing, in the case of the file being identified on an exclude list.) The backup copy 414 may also be saved to a remote storage (not shown) as previously described.

FIG. 4B illustrates the response when a change to a file 416 occurs for which existing backup settings 404 are not indicated. The system 400 checks for backup settings 404 pertinent to the file 416 as before. However, in response to there being no pertinent backup settings 404, the backup program 402 now provides a backup settings request 420 for the file 416 to the user. The backup settings request 420 includes a list of options for making any backup copies corresponding to the file 416. The choices may be presented in a dialog box format. The first options are in a mutually exclusive radio checkbox group and the last item is a standalone checkbox. The handling of these options are described in detail in the following section. If the user indicates any option directing a backup (file name or type), a backup copy 418 is directly saved for the current file 416. Separate from the list of options, the user can elect to indicate whether the setting is to be saved and applied to future changes to the file. It should be understood that the settings for file type 408 extend beyond merely the specific file 416 that prompted the backup settings request 420. The file type selections will impact future changes to more files than simply the file 416. Because of this, the system 400 is able to operate more efficiently and make fewer requests in the future.

Figure 5A:
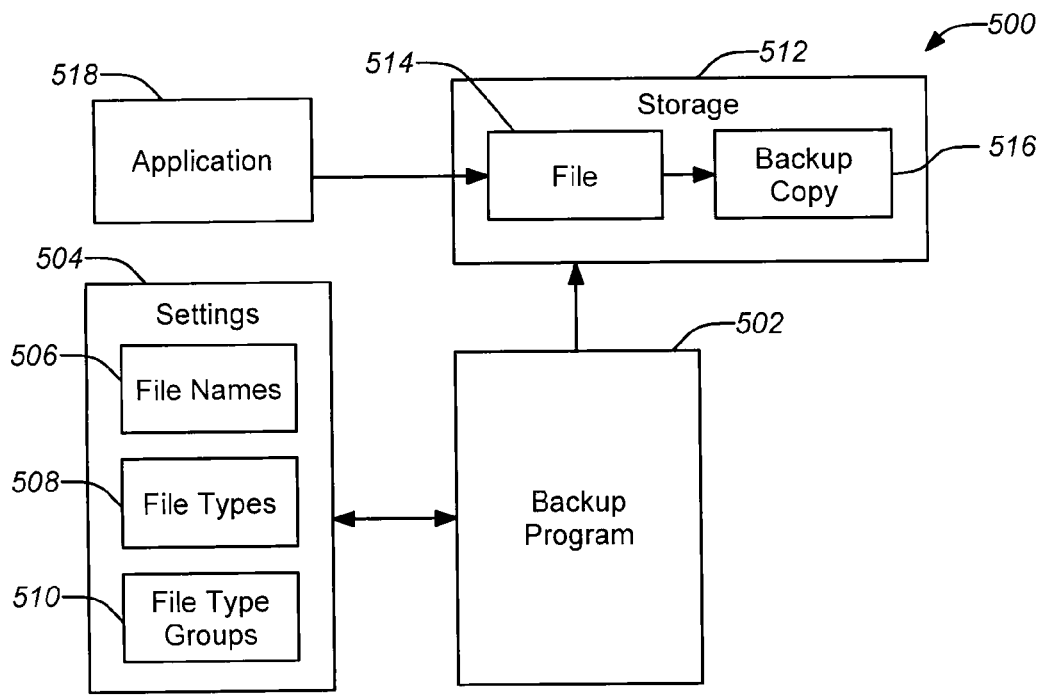
FIGS. 5A & 5B illustrates an exemplary embodiment of the invention providing a request for backup settings in response to a file being changed by an unlisted application.
Figure 5B:
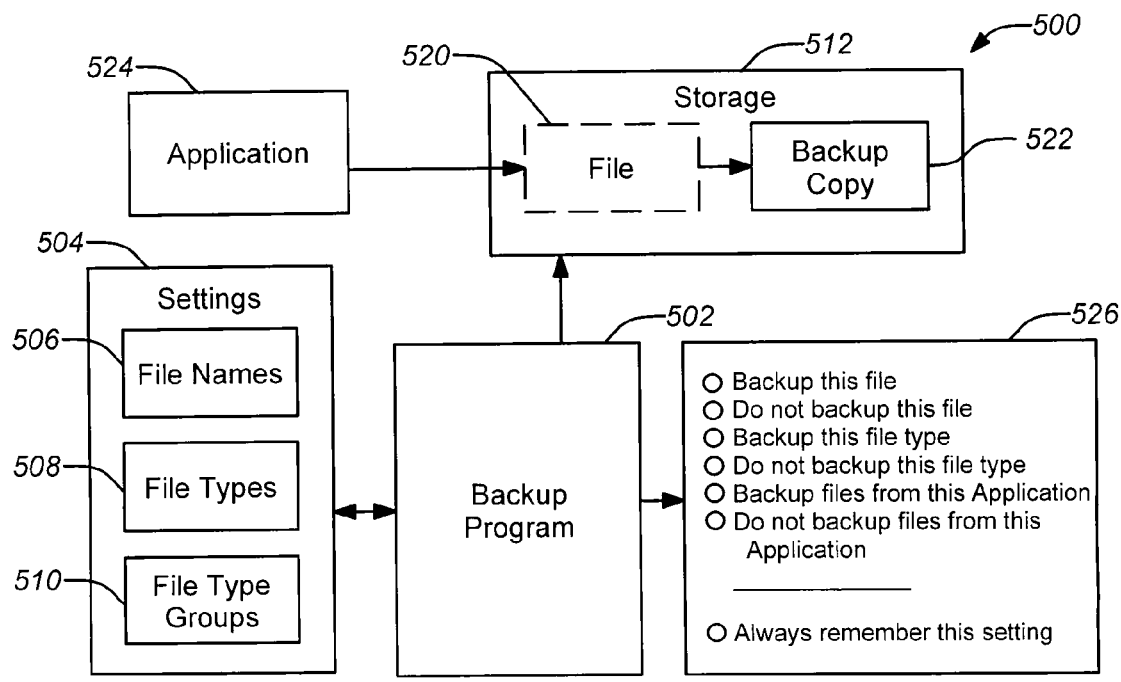

FIGS. 5A & 5B illustrates an exemplary embodiment of the invention providing a request for backup settings in response to a file being changed by an unlisted application. This system 500 operates employing the categories of file name 506, file type 508 and file type group 510 (e.g. an associated application) in the backup settings 504. FIG. 5A illustrates the response when a change to a file 514 in the storage 512 occurs for which existing backup settings 404 are indicated (either in the include or exclude file name 406 list, the include or exclude file type 408 list or the include or exclude application list 510 as illustrated in FIG. 3B). The system 500, e.g. the backup program 502 monitors changes to files in the storage 512 as well as the applications responsible for those changes. For this example, application 518 is responsible for the change to file 514 and the application 518 is included in the file type group list 510. Thus, the backup program 402 simply performs the indicated backup operation and saves a backup copy 516 of the file 514. (Note that in the case of the file being identified on an exclude list, the indicated operation may alternately be to do nothing.) The backup copy 516 may also be saved to a remote storage (not shown) as previously described.

FIG. 5B illustrates the response when a change to a file 416 occurs for which existing backup settings 404 are not indicated. The system 500 checks for backup settings 504 pertinent to the file 520 as before. However, in response to there being no pertinent backup settings 504, the backup program 502 now provides a backup settings request 526 for the file 520 to the user. The backup settings request 526 includes a list of options for making any backup copies corresponding to the file 520. The choices may be presented in a dialog box format. The first options are in a mutually exclusive radio checkbox group and the last item for saving is a standalone checkbox. The handling of these options are described in detail in section 4 hereafter. If the user indicates any option directing a backup (file name, type or application), a backup copy 522 is directly saved for the current file 520. The user can elect to indicate whether the setting is to be saved and applied to future changes to the file independent from the first list of options. It should be understood that the backup settings for file type 508 extend beyond merely the specific file 520 that prompted the backup settings request 526 and the backup settings for the application 524 (file type groups 5 10) extend further beyond those for file type 508. The file type selections will impact future changes to more files than simply the file 520. The file type group selections (e.g. of an application) will impact future changes to any file of any file type that is changed by the application. Because of this, the system 500 is able to operate even more efficiently and make even fewer requests to the user in the future.

A typical embodiment of the invention may be implemented using a typical backup system, e.g. IBM Tivoli Continuous Data Protection for Files (CDP). The backup system can utilize hooks or filters the operating system that allowing it to detect when a file has been changed and what application changed it. The backup system performs "copy on close" backups; the software waits for an application to modify a file and close it before the backup software makes the determination whether to back it up. The backup software has an exclude file list and an include file list that are checked each time a file changes so that the backup software can determine if it should be backed up. These include/exclude lists can be populated with full file names and paths or with wildcard expressions to represent a class of files (file names, file types, or file type groups). Conventional syntax and expressions known in the art for denoting files and directories may be used.

In one exemplary embodiment of the invention, a second set of include/exclude list may be created as previously described. This additional set may be used to track applications, rather than file names or file types. For example, if a user decided that all Microsoft Word generated files should be backed up, Microsoft Word would be added to the application include list. If the user decided that Lotus Notes generated files should not be backed up, Lotus Notes would go into the application exclude list. The backup software can check these new application include/exclude at the same time it checks the file include/exclude lists. Although some other software have employed techniques for monitoring applications, e.g., firewall software such as ZoneLabs firewall software, the manner and objectives are unrelated to the requirements of backup software as described in the present application.

Figure 6:
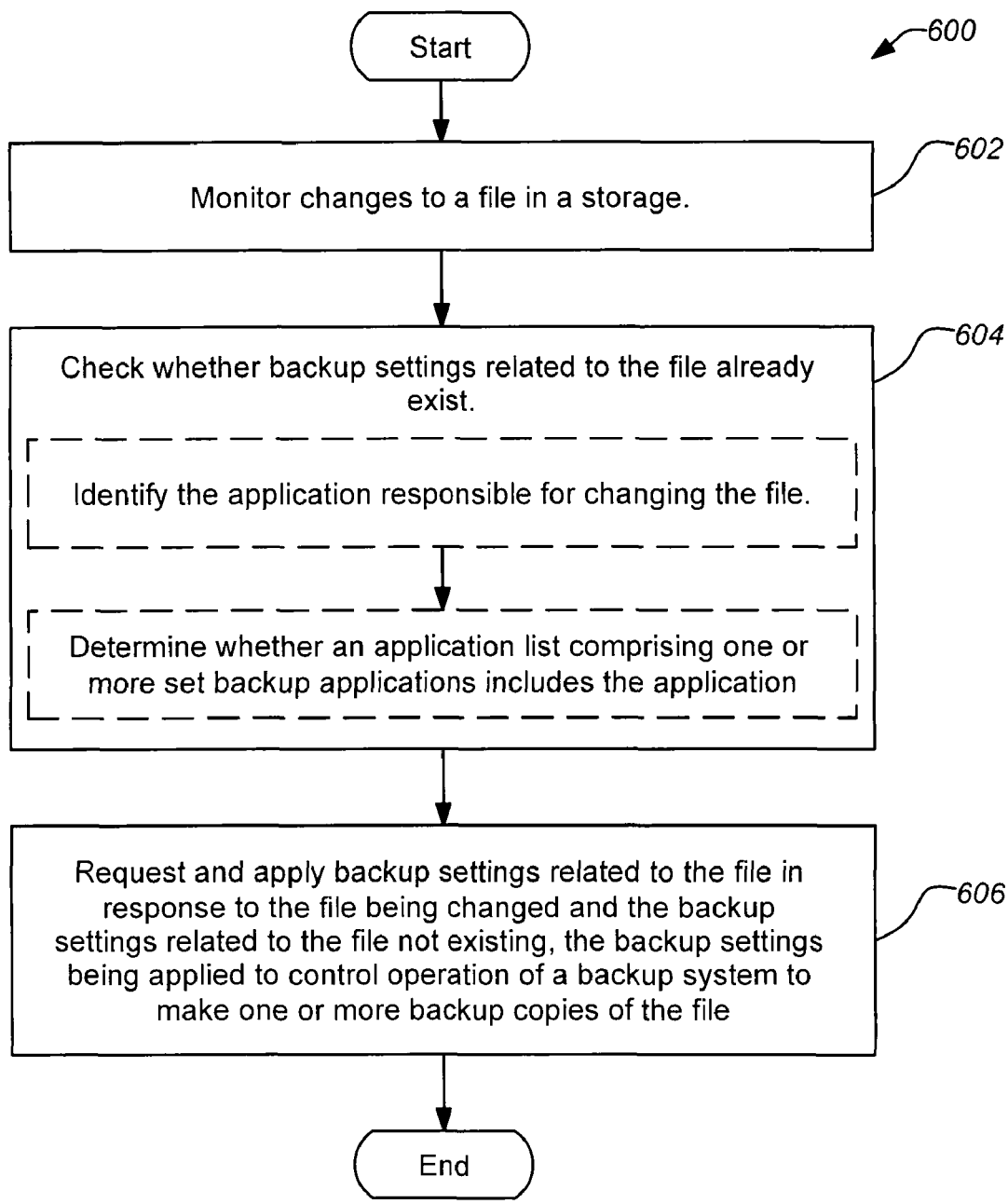
FIG. 6 is a flowchart of an exemplary method for determining which user files to backup for a backup product.

FIG. 6 is a flowchart of an exemplary method 600 for determining which user files to backup for a backup product. The method 600 includes with the operation 602 of monitoring changes to a file in a storage. In operation 604, a check is made to determine whether backup settings related to the file already exist. In operation 606 backup settings related to the file are requested and applied in response to the file being changed and the backup settings related to the file not already existing, the backup settings being applied to control operation of a backup system to make one or more backup copies of the file. In some embodiments, checking for existing backup settings related to the file can involve the application that changed the file. For example, checking for existing backup settings related to the file can include the suboperations of identifying the application responsible for changing the file and determining whether an application list comprising one or more set backup applications includes the application. If the application list includes the application, the backup settings are not requested. These optional operations may be employed to reduce how frequently backup settings will be requested from the user.

The method 600 may be further modified consistent with the program and system embodiments previously described. For example, applying the backup settings may comprise electively saving the backup settings. Saving the backup settings involves adding the application responsible for changing the file to the list of set backup applications.

4. Example Request Response for Determining Backup Settings

Returning to the example of a later installed PowerPoint application and referencing the same backup setting selection choices presented in FIGS. 5A & 5B, an example request response for determining backup settings may be described if PowerPoint is saving a file for the first time. The example file is named "C:\MyFirstPowerPoint.ppt". The include/exclude lists of the backup settings will be populated based on the user's choice among the six mutually exclusive options in the following manner. The first pair of choices are directed exclusively to the present file that was changed by file name. If the user selects the first option to backup the file, "C:\MyFirstPowerPoint.ppt" will be put into the file include list. If the user selects the second option to not backup the file, "C:\MyFirstPowerPoint.ppt" will be put into the file exclude list. The next pair of choices are directed to treatment of the file type associated with the file just changed. The third option of indicating a backup up the file type will result in "*.ppt" being put into the file include list. If the indicates not to backup the file type, "*.ppt" will be put into the file exclude list. The last pair of options are directed to the file type group associated with the file type of the file that was changed. In this case, the file type group corresponds to all the file types associated with the application responsible for changing the file. If the user directs the backup software to backup files from the associated application, PowerPoint will be put into the application include list. Similarly, if the user indicates not to backup files from this application, PowerPoint will be put into the application exclude list.

The selected option will be immediately performed only for the file that was changed. Separately, the user may also indicate whether the same selection is to be automatically applied to applicable files that are changed thereafter by electively saving the backup setting. If the user does not elect to save the backup setting (e.g. by selecting "Always remember this setting"), no changes to the include/exclude lists will be made. If the file is changed again later, the user will be prompted again. As described, the foregoing example assumes that the user elected to save the settings.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. A computer program embodied on a computer readable medium, comprising:
    program instructions for monitoring changes to a file in a storage;
    program instruction for checking whether backup settings related to the file exist;
    program instructions for requesting the backup settings related to the file in response to both the file being changed and the backup settings related to the file not existing;

program instructions for applying the backup settings to control operation of a backup system to make one or more backup copies of the file;
program instructions for identifying an application responsible for changing the file; and
program instructions for determining whether an application list comprising one or more set backup applications includes the application;
wherein the backup settings are not requested in response to determining that the application list includes the application.

2. The computer program of claim 1, wherein applying the backup settings comprises electively saving the backup settings such that, in response to saving the backup settings, further one or more backup copies of the file will be made repeatedly thereafter in response to further changes to the file without requesting the backup settings.

3. The computer program of claim 1, wherein applying the backup settings comprises electively saving the backup settings in one or more lists of identified files to be backed up and the identified files are identified by categories including file name, file type and a file type group associated with an application.

4. The computer program of claim 1, wherein applying the backup settings comprises electively saving the backup settings and saving the backup settings comprises adding the application responsible for changing the file to the list of the one or more set backup applications.

5. The computer program of claim 1, wherein monitoring the changes to the file comprises filtering an operating system controlling the changes to the file to signal the changes occurring.

6. The computer program of claim 1, wherein a file type is associated with a plurality of file type files and the plurality of file type files includes the file and applying the backup settings comprises electively saving the backup setting such that the one or more backup copies will be made for each change to any of the plurality of file type files changed thereafter.

7. The computer program of claim 1, wherein a file type group associated with an application includes a plurality of file types, each associated with a plurality of file type files, and one of the plurality of file type files includes the file and applying the backup settings comprises electively saving the backup settings such that the one or more backup copies will be made for each change to any of the plurality of file type files associated with any of the plurality of file types of the file type group associated with the application.

8. The computer program of claim 7, wherein the backup settings comprise an application list including one or more set backup applications and the application is electively saved to the application list.

9. A method, comprising the steps of:
monitoring changes to a file in a storage;
checking whether backup settings related to the file exist;
requesting the backup settings from a user related to the file in response to both the file being changed and the backup settings related to the file not existing;
applying the backup settings to control operation of a backup system to make one or more backup copies of the file;
identifying an application responsible for changing the file; and
determining whether an application list comprising one or more set backup applications includes the application;
wherein the backup settings are not requested in response to determining that the application list includes the application.

10. The method of claim 9, wherein applying the backup settings comprises electively saving the backup settings such that, in response to saving the backup settings, further one or more backup copies of the file will be made repeatedly thereafter in response to further changes to the file without requesting the backup settings.

11. The method of claim 9, wherein applying the backup settings comprises electively saving the backup settings in one or more lists of identified files to be backed up and the identified files are identified by categories including file name, file type and a file type group associated with an application.

12. The method of claim 9, wherein applying the backup settings comprises electively saving the backup settings and saving the backup settings comprises adding the application responsible for changing the file to the list of the one or more set backup applications.

13. The method of claim 9, wherein monitoring the changes to the file comprises filtering an operating system controlling the changes to the file to signal the changes occurring.

14. The method of claim 9, wherein a file type is associated with a plurality of file type files and the plurality of file type files includes the file and applying the backup settings comprises electively saving the backup setting such that the one or more backup copies will be made for each change to any of the plurality of file type files changed thereafter.

15. The method of claim 9, wherein a file type group associated with an application includes a plurality of file types, each associated with a plurality of file type files, and one of the plurality of file type files includes the file and applying the backup settings comprises electively saving the backup settings such that the one or more backup copies will be made for each change to any of the plurality of file type files associated with any of the plurality of file types of the file type group associated with the application.

16. The method of claim 15, wherein the backup settings comprise an application list including one or more set backup applications and the application is electively saved to the application list.

17. A computer system, comprising:
a storage for a file; and
a processor for monitoring changes to the file in the storage, checking whether backup settings related to the file exist, requesting the backup settings from a user related to the file in response to both the file being changed and the backup settings related to the file not existing, applying the backup settings to control operation of a backup system to make one or more backup copies of the file, identifying an application responsible for changing the file; and determining whether an application list comprising one or more set backup applications includes the application;
wherein the backup settings are not requested in response to determining that the application list includes the application.

18. The computer system of claim 17, wherein the one or more backup copies of the file are saved to a storage area network.

* * * * *